(12) United States Patent
Baer et al.

(10) Patent No.: US 7,505,598 B2
(45) Date of Patent: Mar. 17, 2009

(54) ON-THE-FLY ENCRYPTION/DECRYPTION FOR WLAN COMMUNICATIONS

(75) Inventors: Matthias Baer, Hohenstein-Ernstthal (DE); Uwe Eckhardt, Dresden (DE); Attila Roemer, Dresden (DE); Ralf Flemming, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 911 days.

(21) Appl. No.: 10/899,199

(22) Filed: Jul. 26, 2004

(65) Prior Publication Data

US 2005/0190919 A1  Sep. 1, 2005

(30) Foreign Application Priority Data

Feb. 27, 2004  (DE) .................. 10 2004 009 518

(51) Int. Cl.
*H04K 1/00* (2006.01)
*H04M 1/66* (2006.01)

(52) U.S. Cl. .................. 380/270; 380/37; 455/3.01; 455/410

(58) Field of Classification Search .................. 380/37, 380/270; 455/3.01
See application file for complete search history.

(56) References Cited

U.S. PATENT DOCUMENTS 5,161,193 A * 11/1992 Lampson et al. ............ 713/151
6,880,087 B1 * 4/2005 Carter .......................... 726/23
6,954,450 B2 * 10/2005 Krischer et al. ............. 370/338
2003/0194088 A1 * 10/2003 Fischer et al. ................ 380/270
2005/0135628 A1 * 6/2005 Dacosta ....................... 380/283

FOREIGN PATENT DOCUMENTS

WO     2005/057964     6/2005

OTHER PUBLICATIONS

Translation of Official Communication in DE 10 2004 009 518.3-31 issued Feb. 21, 2007.

* cited by examiner

*Primary Examiner*—Minh Dieu Nguyen
(74) *Attorney, Agent, or Firm*—Meyertons Hood Kivlin Kowert & Goetzel, P.C.; B. Noel Kivlin

(57) ABSTRACT

A communication device for performing cryptographically secured communication in a WLAN (Wireless Local Area Network) network is provided that comprises a security enhancement unit and a MAC (Medium Access Control) unit. The security enhancement unit is for encrypting plaintext data frames into encrypted data frames and/or decrypting encrypted data frames into plaintext data frames. The MAC unit is for managing communication between communication devices within the WLAN network by coordinating access to a shared wireless communication medium through which communication signals are transmitted. The security enhancement unit and the MAC unit are adapted to perform an on-the-fly encryption process and/or on-the-fly decryption process thereby exchanging the encrypted data frames without buffering the encrypted data frames after encryption or prior to decryption, respectively. The embodiments may provide an improved encryption/decryption architecture including an on-chip memory for performing on-the-fly encryption and/or on-the-fly decryption in the framework of 802.11i security enhancement.

27 Claims, 6 Drawing Sheets

ON-THE-FLY ENCRYPTION/DECRYPTION FOR WLAN COMMUNICATIONS

BACKGROUND OF THE INVENTION

1. Field of the Invention

The present application relates to communication devices for performing cryptographically secured communication in a WLAN (Wireless Local Area Network) network and corresponding integrated circuit chips, computer systems and methods, and in particular to the manner in which encryption/decryption is performed therein.

2. Description of the Related Art

A wireless local area network is a flexible data communication system implemented as an extension to or as an alternative for a wired LAN. Using radio frequency or infrared technology, WLAN systems transmit and receive data over the air minimizing the need for wired connections. Thus, WLAN systems combine data connectivity with user mobility.

Today, most WLAN systems use spread spectrum technology, a wideband radio frequency technique developed for use in reliable and secure communication systems. The spread spectrum technology is designed to trade-off bandwidth efficiency for reliability, integrity and security. Two types of spread spectrum radio systems are frequently used: frequency-hopping and direct sequence systems.

The standard defining and governing wireless local area networks that operate in the 2.4 GHz spectrum is the IEEE 802.11 standard. To allow higher data rate transmissions, the standard was extended to 802.11b which allows data rates of 5.5 and 11 Mbps in the 2.4 GHz spectrum. Further extensions exist.

In order to address existing security gaps of the 802.11 standard's native security, i.e., the WEP (Wired Equivalent Privacy) protocol, the 802.11i security standard was developed. This enhanced security standard relies on the 802.1x standard for port-based access control and the TKIP (Temporal Key Integrity Protocol) and CCMP (Counter-mode Cypher block chaining Message authentication code Protocol) protocols for data frame encryption and decryption. 802.1x provides a framework for WLAN station authentication and cryptographic key distribution, both features originally missing from the 802.11 standard. According to the TKIP and CCMP protocols, data frames are encrypted using a character string that is generated individually for each data frame. This encryption character string is based on a packet number or sequence number inserted in the data frame indicating data frame ordering. Out of order data frames are discarded. Thereby and by several further measures, the TKIP and CCMP protocols provide enhanced communication security over the original WEP protocol, the TKIP protocol being targeted at legacy equipment and the CCMP protocol being targeted at future WLAN equipment.

To perform a cryptographically secured exchange of data frames according to the above-described communication security techniques or similar approaches known in the art, existing WLAN systems apply multiple-stage transmission and reception processes. Between the individual transmission or reception stages, the data frames are buffered. This may lead to a number of disadvantages.

Figure 1:
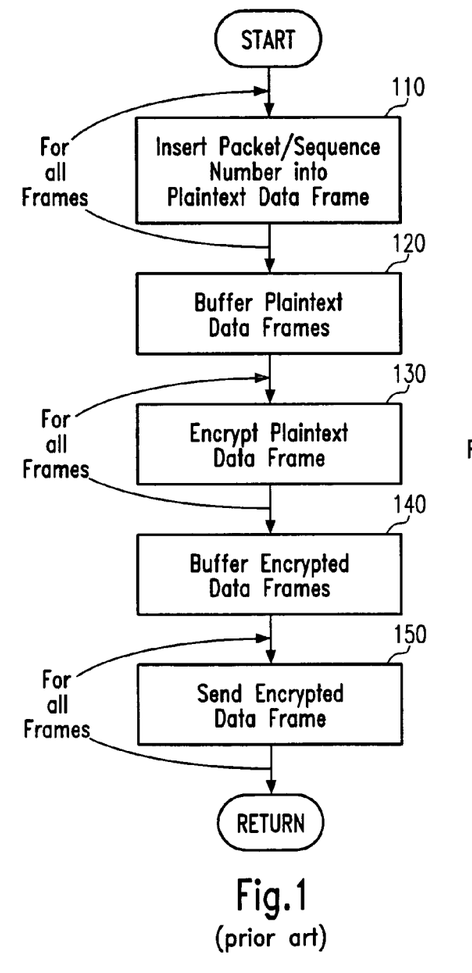
FIG. 1 is a flow diagram illustrating a transmission process according to prior art.

FIG. 1 shows a conventional multi-stage transmission process. In step 110, a packet and/or sequence number is inserted into a plaintext data frame. This step is repeated for each of the plaintext data frames. All the plaintext data frames to which the packet and/or sequence number has been inserted are buffered in step 120. In step 130, one of the buffered plaintext data frames is encrypted. The encryption is repeated for each of the buffered plaintext data frames. The encrypted data frames are buffered again in step 140. Finally, in step 150, one of the buffered encrypted data frames is sent to a WLAN communication counterpart. Step 150 is repeated for all the buffered encrypted data frames.

Usually, steps 120 to 150 are performed by a particular WLAN device within the WLAN system. Step 100 of inserting the packet and/or sequence number into the plaintext data frame, however, is performed by the CPU (Central Processing Unit) of the WLAN system. This may cause a waste of processing capacities of the high performance CPU for a simple data combination task.

Further, conventional systems may suffer from processing delays in the CPU which may occur during the insertion step 100 of the packet and/or sequence numbers into the plaintext data frames. Such processing delays usually result in unnecessary deceleration of the transmission process and may therefore lead to further problems in achieving efficient transmission data rates.

Moreover, the multiple buffering steps 120, 140 for the data frames generally still aggravates the problem of achieving efficient transmission data rates. Each step of buffering a data frame causes a retardation of the transmission process.

Figure 3:
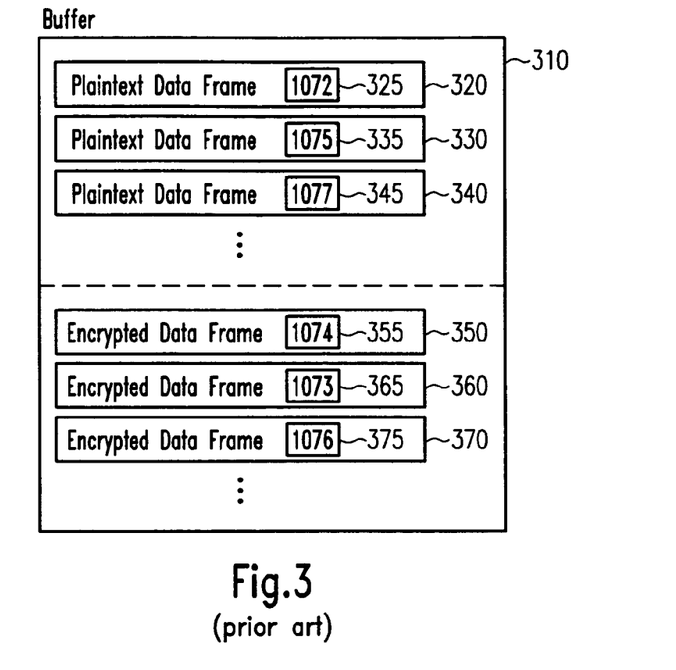
FIG. 3 illustrates the content of a buffer used during a transmission process and/or reception process according to prior art.

FIG. 3 schematically shows the content of a buffer 310 in a conventional WLAN system. Plaintext data frames 320, 330, 340, as well as encrypted data frames 350, 360, 370, are buffered. Each of the data frames includes an individual packet and/or sequence number 325, 335, 345, 355, 365, 375.

Since both plaintext data frames and encrypted data frames are buffered, existing WLAN systems usually suffer from intense buffer load. This may cause unnecessarily high buffer management complexity and buffer costs.

In addition, the feature of buffering data frames 320, 330, 340, 350, 360, 370 to which packet and/or sequence numbers 325, 335, 345, 355, 365, 375 have already been inserted may lead to considerable data faults in prior art WLAN systems. When the encrypted data frames are read from the buffer and sent in a different order than the plaintext data frames have been written to the buffer, out of order transmission of data frames occurs. At reception, out of order data frames are discarded for security reasons. Therefore, the buffering of data frames including packet and/or sequence numbers during the transmission process may represent a severe reason for data loss in conventional systems.

Figure 5:
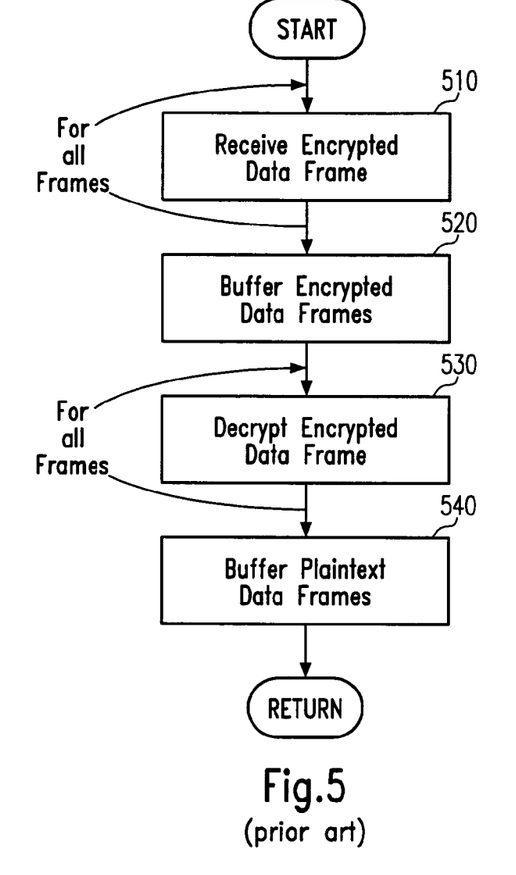
FIG. 5 is a flow diagram illustrating a reception process according to prior art.

Referring now to FIG. 5, a reception process in existing WLAN systems is schematically shown. In step 510, encrypted data frames are received from a WLAN communication counterpart. Step 510 is repeated for all data frames received. Once an encrypted data frame has been received, it is buffered in step 520. In step 530, a buffered encrypted data frame is decrypted. This step is repeated for all the encrypted data frames contained in the buffer. In step 540, the plaintext data frames resulting from the decryption step 530 are buffered again.

As illustrated in FIG. 5, a conventional reception process comprises multiple buffering of the data frames. Therefore, the above-discussed problems of existing WLAN systems relating to inefficient transmission data rates and unnecessarily high buffer load also emerge during the reception process.

Further, the feature of buffering the encrypted data frames between the reception step 510 and the decryption step 530 allows that the individual data frames are decrypted 530 in different order than they have been received. Thus, conventional WLAN systems often suffer from the above-discussed problem of considerable data faults also during the reception process.

SUMMARY OF THE INVENTION

An improved communication device for performing cryptographically secured communication in a WLAN network and corresponding integrated circuit chips, computer systems and methods are provided that may overcome the disadvantages of the conventional approaches. In particular, proposed embodiments of the invention may offer enhanced data throughput during the transmission and/or reception processes. Other embodiments may reduce the required buffering capacity. Further embodiments may provide the potential for decreasing the amount of data faults during the transmission and/or reception processes. Moreover, embodiments of the invention may afford the opportunity for lowering the CPU processing load.

In one embodiment, a communication device for performing cryptographically secured communication in a WLAN network is provided that comprises a security enhancement unit and a MAC (Medium Access Control) unit. The security enhancement unit is for encrypting plaintext data frames into encrypted data frames and/or decrypting encrypted data frames into plaintext data frames. The MAC unit is for managing communication between the communication device and other communication devices within the WLAN network by coordinating access to a shared wireless communication medium for which communication signals are transmitted. The security enhancement unit and the MAC unit are adapted to perform an on-the-fly encryption process and/or on-the-fly decryption process thereby exchanging the encrypted data frames without buffering the encrypted data frames after encryption or prior to decryption, respectively.

In another embodiment, an integrated circuit chip for performing cryptographically secured communication in a WLAN network is provided that comprises a security enhancement circuit and a MAC circuit. The security enhancement circuit is for encrypting plaintext data frames into encrypted data frames and/or decrypting encrypted data frames into plaintext data frames. The MAC circuit is for managing communication between the integrated circuit chip and communication counterparts within the WLAN network by coordinating access to a shared wireless communication medium through which communication signals are transmitted. The security enhancement circuit and the MAC circuit are adapted to perform an on-the-fly encryption process and/or on-the-fly decryption process thereby exchanging the encrypted data frames without buffering the encrypted data frames after encryption or prior to decryption, respectively.

In a further embodiment, a computer system capable of performing cryptographically secured communication in a WLAN network is provided that comprises a security enhancement device and a MAC device. The security enhancement device is for encrypting plaintext data frames into encrypted data frames and/or decrypting encrypted data frames into plaintext data frames. The MAC device is for managing communication between the computer system and other computer systems within the WLAN network by coordinating access to a shared wireless communication medium through which communication signals are transmitted. The security enhancement device and the MAC device are adapted to perform an on-the-fly encryption process and/or on-the-fly decryption process thereby exchanging the encrypted data frames without buffering the encrypted data frames after encryption or prior to decryption, respectively.

In yet another embodiment, a method of performing cryptographically secured communication by a communication device in a WLAN network is provided that comprises performing an on-the-fly encryption process and/or on-the-fly decryption process of data frames. The step of performing the on-the-fly encryption process and/or on-the-fly decryption process comprises encrypting plaintext data frames into encrypted data frames and/or decrypting encrypted data frames into plaintext data frames by a security enhancement unit. Further, the step of performing the on-the-fly encryption process and/or on-the-fly decryption process comprises exchanging the encrypted data frames between the security enhancement unit and a MAC unit, wherein the MAC unit is arranged to manage communication between communication counterparts within the WLAN network by coordinating access to a shared wireless communication medium through which communication signals are transmitted. The step of exchanging the encrypted data frames is performed without buffering the encrypted data frames after encryption or prior to decryption, respectively.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 2:
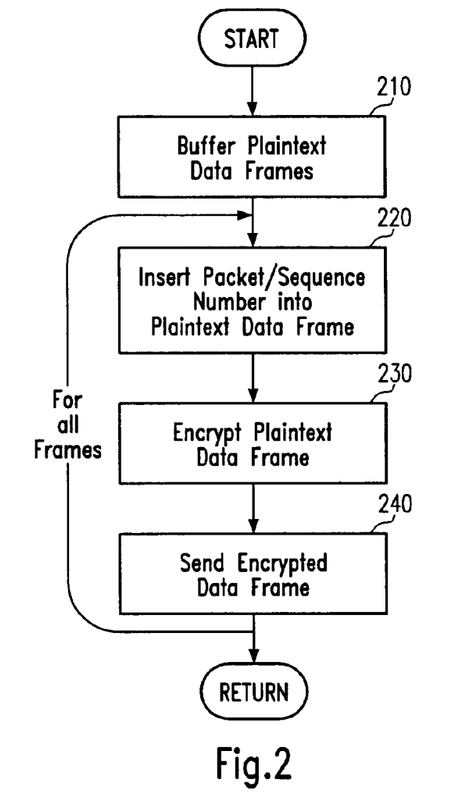
FIG. 2 is a flow diagram illustrating a transmission process according to an embodiment.

Referring now to FIG. 2, a flow diagram of a transmission process according to an embodiment is shown. Plaintext data frames are buffered in step 210. Then in step 220, a packet and/or sequence number is inserted into a plaintext data frame. In the following, the plaintext data frame is encrypted in step 230. Finally, in step 240 the encrypted data frame resulting from step 230 is sent to a communication counterpart within the WLAN network. The sequence of steps 220 to 240 is repeated for all the plaintext data frames within the buffer.

In comparison to FIG. 1, which illustrates a transmission process according to prior art, no buffering of encrypted data frames occurs according to the present embodiment. Once the encryption step 230 of a plaintext data frame is completed, the system may proceed with sending the encrypted data frame in step 240 without any buffering of data frames after the encryption, i.e. the encryption is performed "on-the-fly".

Further, in the present embodiment, step 220 of inserting the packet and/or sequence number into a plaintext data frame is performed not before buffering the plaintext data frame as shown in FIG. 1, but after the buffering step 210. In conventional WLAN systems, step 110 of inserting a packet and/or sequence number into a plaintext data frame can be performed on the individual data frames in a different order than the encryption step 130, which can in turn be performed on the individual data frames in a different order than the sending step 150, since the data frames are buffered between those steps. According to the illustrated embodiment, however, no buffering occurs between the steps 220 to 240 of inserting a packet and/or sequence number into a plaintext data frame, encrypting the plaintext data frame, and sending the encrypted data frame. Therefore, the individual data frames are passed in the same order through those steps.

Figure 4:
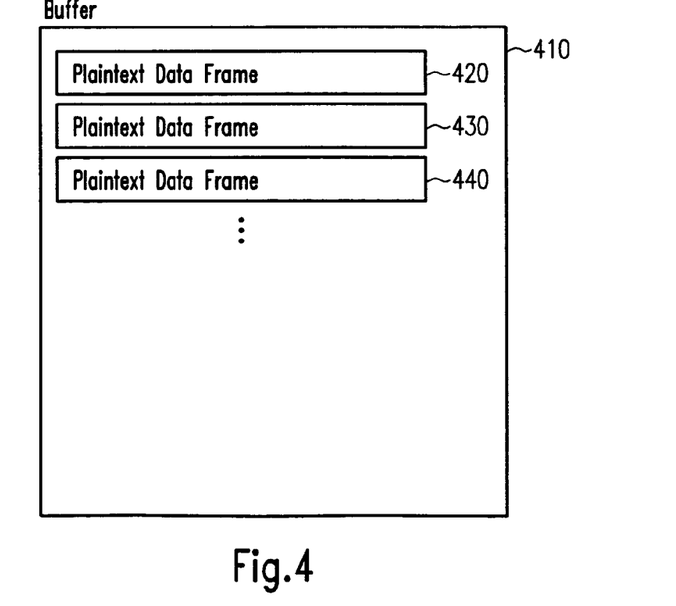
FIG. 4 illustrates the content of a buffer used during a transmission process and/or reception process according to an embodiment.

FIG. 4 schematically shows the content of a buffer in a WLAN system according to an embodiment. In this embodiment, the buffer 410 includes plaintext data frames 420, 430, 440. In comparison to FIG. 3, which illustrates the content of a buffer 310 in a conventional WLAN system, the buffer 410 includes only plaintext data frames 420, 430, 440 but no encrypted data frames. In one embodiment, the WLAN system may represent a WLAN transceiver. The buffer 410 then acts as a data buffer for plaintext data only in both directions, i.e. during the transmission process and the reception process. In other embodiments, the WLAN system may provide WLAN transmission or WLAN reception functionality only. In such embodiments, the buffer 410 may act as a data buffer for plaintext data only during the transmission process or the reception process respectively.

In an embodiment where the buffer 410 is used during a transmission process, the buffered plaintext data frames 420, 430, 440 may include no packet and/or sequence numbers. In other embodiments, however, e.g., when the buffer 410 is used during a reception process, packet and/or sequence numbers may be included in the buffered plaintext data frames 420, 430, 440.

Figure 6:
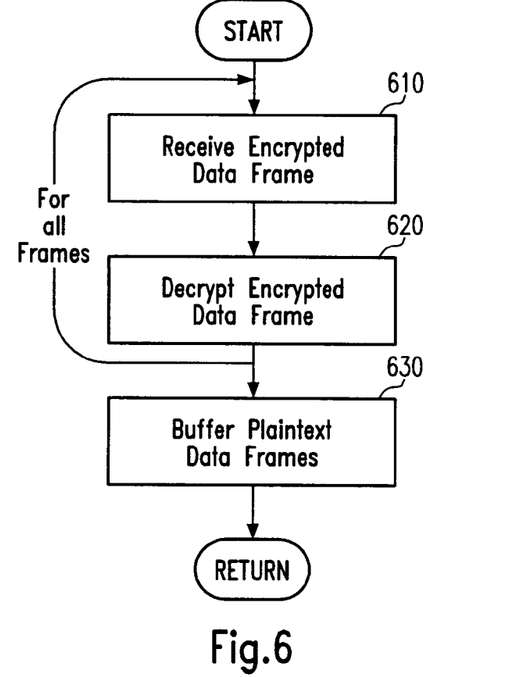
FIG. 6 is a flow diagram illustrating a reception process according to an embodiment.

Turning now to FIG. 6, a schematical flow diagram of a reception process in a WLAN system according to an embodiment is shown. In this embodiment, encrypted data frames are received from a communication counterpart within the WLAN system over the shared wireless communication medium in step 610. In step 620, the received encrypted data frames are decrypted. A WLAN system according to the embodiment may repeat the sequence of receiving and decrypting the encrypted data frames for all the encrypted data frames arriving over the shared wireless communication medium. In step 630, the plaintext data frames resulting from the decryption may be buffered.

As described above, conventional WLAN systems, whose reception process is illustrated in FIG. 5, usually buffer the encrypted data frames after the receiving step 510. According to the illustrated embodiment, no buffering of encrypted data frames occurs. The steps 610 and 620 of receiving and decrypting the encrypted data frames are performed without buffering the encrypted data frames prior to decryption, i.e. the decryption is performed "on-the-fly".

Further, according to prior art, the decryption step 530 can be performed on the individual data frames in a different order than the data frames have been received in step 510. In the present embodiment, however, the individual data frames are decrypted in the same order that they have been received since they are not buffered prior to decryption.

It is to be noted that with respect to the above-discussed FIGS. 1, 2, 5 and 6, the encrypted data frames are sent and/or received in the form of transmission signals (communication signals) adapted to the physical nature of the shared wireless communication medium. The transmission and reception processes shown in FIGS. 1, 2, 5 and 6 may comprise further substeps, e.g., for converting the encrypted data frames into transmission signals or vice versa, which are not depicted for clarity reasons.

Figure 7:
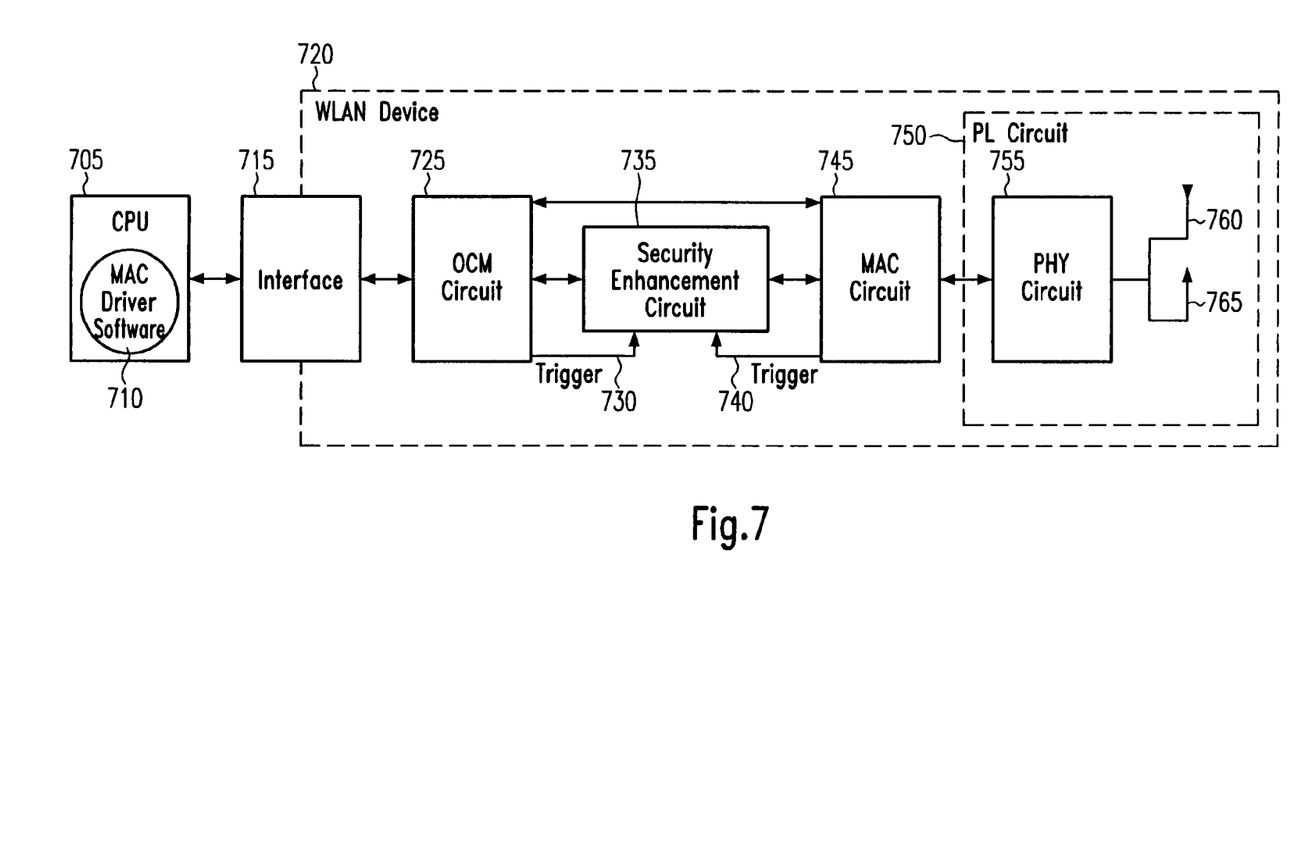
FIG. 7 is a block diagram illustrating the components of a WLAN-compatible computer system according to an embodiment.

Referring now to FIG. 7, a WLAN compatible computer system according to an embodiment is illustrated. The computer system may comprise an implementation of the 802.11 i security enhancement in hardware.

The computer system may comprise a WLAN device 720. According to the illustrated embodiment, an OCM (On Chip Memory) circuit 725 may be included in the WLAN device 720. The OCM circuit 725 may correspond to the above-discussed buffer 410. Further, the WLAN device 720 may comprise a security enhancement circuit 735 for encrypting plaintext data frames into encrypted data frames and/or decrypting encrypted data frames into plaintext data frames. Moreover, the WLAN device 720 may comprise a MAC circuit (MAC core) 745 for managing communication between the computer system and other computer systems within the WLAN network by coordinating access to the shared wireless communication medium through which the communication signals are transmitted. The MAC circuit 745 may be connected to the OCM circuit 725, e.g., for inserting 220 packet and/or sequence numbers into plaintext data frames. The OCM circuit 725 may be connected to the security enhancement circuit 735 for exchanging, e.g., plaintext data frames. The security enhancement circuit 735 may in turn be connected to the MAC circuit 745 for at least exchanging encrypted data frames. According to the embodiment, further connections 730, 740 may be provided from the OCM circuit 725 to the security enhancement unit 735 and from the MAC circuit 745 to the security enhancement circuit 735 through which trigger signals may be sent to the security enhancement circuit 735.

The WLAN device 720 may also comprise a PL (Physical Layer) circuit 750 for providing a physical connection of the WLAN device 720 to the shared wireless communication medium. The PL circuit 750 may comprise a PHY (Physical layer) circuit 755 and an antenna 760, 765 for sending and/or receiving the communication signals over the shared wireless communication medium. The MAC circuit 745 may be connected to the PL circuit 750 for forwarding encrypted data frames from the security enhancement circuit 735 to the PL circuit 750 and/or in the opposite direction. In an embodiment, the PHY circuit 755 may be connected to the antenna 760, 765 for controlling operations of the antenna 760, 765, and the MAC circuit 745 may be connected to the PHY circuit 755 for forwarding encrypted data frames from the security enhancement circuit 735 to the PHY circuit 755 and/or vice versa.

The WLAN device 720 may be installed on a host computer system comprising a CPU 705 for providing in combination with a MAC driver software 710 running on the CPU 705 WLAN compatibility to the computer system. The OCM circuit 725 of the present embodiment may be connected to the CPU 705 over the interface 715 so that the OCM circuit 725 and the CPU 705 are capable of exchanging plaintext data frames. According to the embodiment, the MAC circuit 745 may be provided with DMA (Direct Memory Access) functionality for communicating with the OCM circuit 725 without interaction of the CPU 705 or any other external processor.

Figure 8:
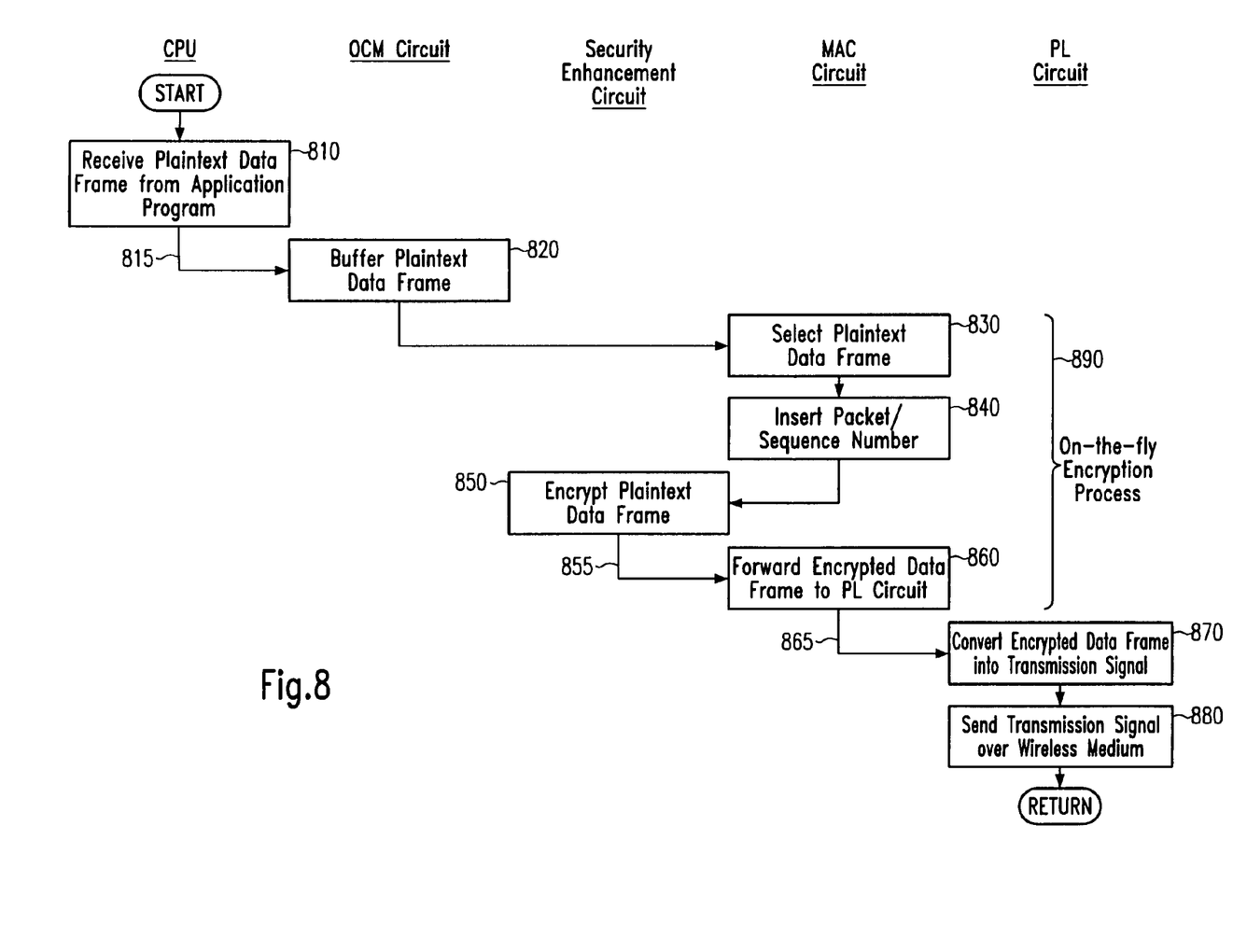
FIG. 8 illustrates a transmission process for one data frame according to an embodiment.

Referring now to FIG. 8, a flow diagram of a transmission process for one data frame according to an embodiment is shown. In this embodiment, plaintext data frames are generated by application programs running on the host computer system. In step 810, the CPU 705 may receive a plaintext data frame from an application program and transfer the plaintext data frame to the OCM circuit 725 in step 815. At the OCM circuit 725, the plaintext data frame may be buffered 820.

In the illustrated embodiment, the following on-the-fly encryption process 890 may comprise the steps 830 to 865. In step 830, the MAC circuit 745 may select a plaintext data frame intended for encryption from the OCM circuit 725. The MAC circuit 745 may also insert a packet and/or sequence number into the selected plaintext data frame in step 840. In one embodiment, the packet and/or sequence number is inserted in the moment the frame is scheduled to send on air. In other embodiments, the packet and/or sequence number may be inserted at any other time prior to encryption. In such embodiments, the security enhancement circuit 735 may overwrite the packet and/or sequence number. In step 850, the security enhancement circuit 735 may encrypt the plaintext data frame into an encrypted data frame. The encrypted data frame may be transferred to the MAC circuit 745 in step 855. According to the embodiment, the MAC circuit 745 may forward the encrypted data frame to the PL circuit 750 in step 860. In step 865, the encrypted data frame may be transferred to the PL circuit 750.

Once the on-the-fly encryption process 890 has been performed on the data frame, the PL circuit 750 of a WLAN system according to an embodiment may convert 870 the encrypted data frame into a transmission signal interchangeable with a communication counterpart within the WLAN network over the shared wireless communication medium. The conversion step 870 may comprise converting a digital encrypted data frame into an analog transmission signal, e.g., a radio or infrared signal. In step 880, the PL circuit 750 may send the transmission signal to a communication counterpart within the WLAN network over the shared wireless communication medium.

In an embodiment, steps 855 to 865 of transferring the encrypted plaintext data frame from the security enhancement circuit 735 to the MAC circuit 745, forwarding the encrypted data frame to the PL circuit 750 by the MAC circuit 745, and transferring the encrypted data frame from the MAC circuit 745 to the PL circuit 750 may be performed without buffering the encrypted data frame after encryption. In another embodiment, steps 830 and 840 of selecting a plaintext data frame and inserting a packet and/or sequence number into the plaintext data frame may be performed without buffering the plaintext data frame. In yet another embodiment, the plaintext/encrypted data frame may not be buffered during the entire on-the-fly encryption process 890. In a further embodiment, the steps 870 and 880 of converting the encrypted data frame into the transmission signal and sending the transmission signal may be performed without buffering the encrypted data frame or the transmission signal. Combinations of the embodiments may be performed.

Figure 9:
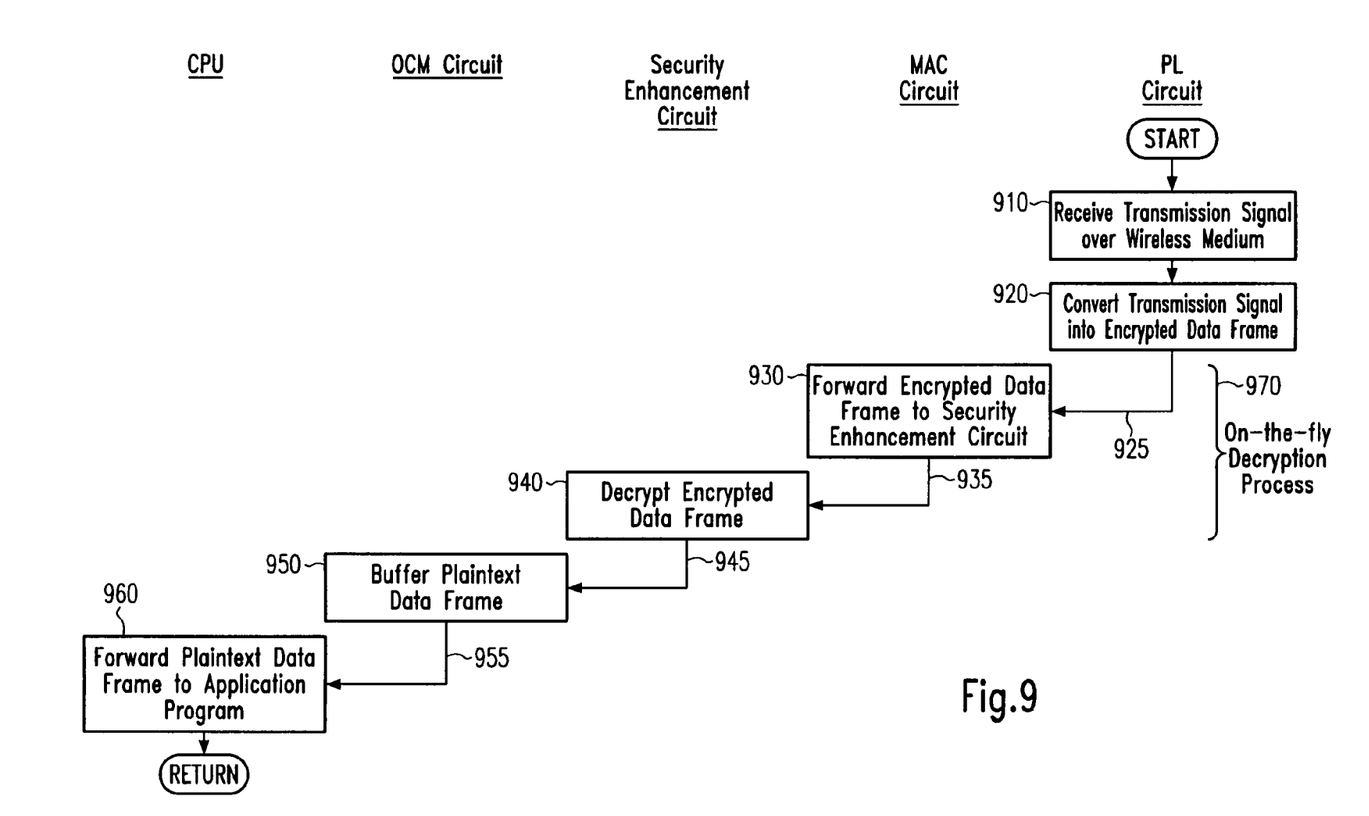
FIG. 9 illustrates a reception process for one data frame according to an embodiment.

Turning now to FIG. 9, a flow diagram of a reception process for one data frame according to an embodiment is illustrated. In step 910, the PL circuit 750 may receive a transmission signal from a communication counterpart within the WLAN network over the shared wireless communication medium. The transmission signal may be an analog signal, e.g., a radio or infrared signal. According to the embodiment, the PL circuit 750 may convert the transmission signal into an encrypted data frame in step 920. The encrypted data frame may be a digital encrypted data frame.

Once the transmission signal has been converted into the encrypted data frame, an on-the-fly decryption process 970 may be launched. According to the illustrated embodiment, the on-the-fly decryption process 970 may comprise the steps 925 to 945. In step 925, the encrypted data frame may be transferred from the PL circuit 750 to the MAC circuit 745. The MAC circuit 745 may forward the encrypted data frame to the security enhancement circuit 735 in step 930. In step 935, the encrypted data frame may be transferred from the MAC circuit 745 to the security enhancement circuit 735. According to the embodiment, the encrypted data frame may be decrypted by the security enhancement circuit 735 in step 940. Once the encrypted data frame has been completely decrypted, the resulting plaintext data frame may be transferred in step 945 from the security enhancement circuit 735 to the OCM circuit 725.

According to the illustrated embodiment, the plaintext data frame is buffered in step 950. Any time later, the buffered plaintext data frame may be transferred from the OCM circuit 725 to the host computer system, e.g. via the CPU 705. In step 960, the CPU 705 may forward the plaintext data frame to an application program running on a host computer system.

In one embodiment, steps 925 to 935 of transferring the encrypted data frame from the PL circuit 750 to the MAC circuit 745, forwarding the encrypted data frame by the MAC circuit 745, and transferring the encrypted data frame from the MAC circuit 745 to the security enhancement circuit 735 may be performed without buffering the encrypted data frame prior to decryption. In another embodiment, all the steps 925 to 945 of the on-the-fly decryption process 970 may be performed without buffering the encrypted/plaintext data frame. In a further embodiment, steps 910 and 920 of receiving the transmission signal and converting the transmission signal into the encrypted data frame may be performed without buffering the encrypted data frame/transmission signal prior to decryption. Combinations of the embodiments may be performed.

In another embodiment, the security enhancement circuit 735 may be adapted to perform the encryption (steps 230 and 850) and/or the decryption (steps 620 and 940) according to the TKIP protocol. In a further embodiment, the security enhancement circuit 735 may be adapted to perform the encryption and/or decryption according to the CCMP protocol. The WLAN device 720 may be adapted to perform cryptographically secured communication in the WLAN network according to the 802.11b standard. Other protocols and standards may be applied. Also, combinations of the embodiments may be implemented.

As apparent from the above description of embodiments, the present invention may be applied for providing new functionality to a WLAN device 720. The embodiments may provide an on-the-fly encryption/decryption architecture with an OCM circuit 725 for 802.11i security enhancement. As discussed above, the data frames may get encoded on demand and no storage of coded data frames may occur. The MAC circuit 745 and/or the PL circuit 750 may comprise a FIFO (First In First Out) unit for temporarily holding the data during operation of the MAC circuit 745 or the PL circuit 750, respectively. However, this may not be understood as the buffering of encrypted data prevented by the described embodiments. Accordingly, the buffering which is prevented by the embodiments, is to be understood as buffering in a random access memory rather than in a FIFO. The buffering is therefore not strictly constrained to prescribed amounts to be buffered, as this is the case in FIFOs, nor with respect to the buffering duration, i.e. the number of clock cycles for which buffering takes place.

The OCM circuit 725 may allow latency compensation imposed by the interface 715 between the MAC hardware and the MAC driver. In the described embodiments, the transmission and/or reception process may be performed in accordance with the hard timing constraints imposed on the data transfer between the MAC circuit 745 and the PHY circuit 755.

The presented on-the-fly encryption/decryption architecture may be applied in combination with AMD's AM1772 WLAN product.

While the invention has been described with respect to the physical embodiments constructed in accordance therewith, it will be apparent to those skilled in the art that various modifications, variations and improvements of the present invention may be made in light of the above teachings and within the purview of the appended claims without departing from the spirit and intended scope of the invention. In addition, those areas in which it is believed that those of ordinary skill in the art are familiar have not been described herein in order to not unnecessarily obscure the invention described herein. Accordingly it is to be understood that the invention is not to be limited by the specific illustrative embodiments, but only by the scope of the appended claims.

What is claimed is:

1. A communication device for performing cryptographically secured communication in a WLAN (Wireless Local Area Network) network, comprising:
    a security enhancement unit for encrypting plaintext data frames into encrypted data frames and decrypting encrypted data frames into plaintext data frames; and
    a MAC (Medium Access Control) unit for managing communication between said communication device and other communication devices within the WLAN network by coordinating access to a shared wireless communication medium through which communication signals are transmitted;
    wherein the security enhancement unit and the MAC unit are adapted to perform an on-the-fly encryption process and on-the-fly decryption process thereby exchanging the encrypted data frames without buffering the encrypted data frames after encryption or prior to decryption, respectively;
    wherein the communication device further comprises a physical layer unit for providing a physical connection of the communication device to the shared wireless communication medium, wherein the MAC unit is further adapted to forward the encrypted data frames from the security enhancement unit to the physical layer unit during the on-the-fly encryption process and from the physical layer unit to the security enhancement unit during the on-the-fly decryption process, wherein the physical layer unit is adapted to convert the encrypted data frames into transmission signals interchangeable over the shared wireless communication medium and convert the transmission signals into the encrypted data frames without buffering the encrypted data frames after encryption or prior to decryption, respectively.

2. The communication device of claim 1, further comprising a storage unit for buffering the plaintext data frames.

3. The communication device of claim 2, wherein the storage unit and the security enhancement unit are arranged to communicate with each other for exchanging the plaintext data frames.

4. The communication device of claim 2, wherein the storage unit and the MAC unit are arranged to communicate with each other for selecting one of the plaintext data frames intended for encryption.

5. The communication device of claim 4, wherein the MAC unit is further adapted to perform DMA (Direct Memory Access) functions for communicating with the storage unit without interaction of an external processor.

6. The communication device of claim 2, wherein the MAC unit is further adapted to select a plaintext data frame intended for encryption from the buffered plaintext data frames during the on-the-fly encryption process.

7. The communication device of claim 1, wherein the MAC unit is further adapted to insert a packet and sequence number into the plaintext data frames during the on-the-fly encryption process.

8. The communication device of claim 2, wherein the MAC unit is further adapted to select a plaintext data frame intended for encryption from the buffered plaintext data frames during the on-the-fly encryption process and insert a packet and sequence number into the plaintext data frame at the moment the plaintext data frame is selected.

9. The communication device of claim 2, wherein the MAC unit is further adapted to select a plaintext data frame intended for encryption from the buffered plaintext data frames during the on-the-fly encryption process;
    wherein the plaintext data frame comprises a packet and sequence number; and
    wherein the security enhancement unit is further adapted to overwrite the packet and sequence number, respectively.

10. The communication device of claim 1, further comprising a storage unit for buffering the plaintext data frames, wherein the storage unit is adapted to send a trigger signal to the security enhancement unit during the on-the-fly encryption process and during the on-the-fly decryption process for making the security enhancement unit encrypt one of the plaintext data frames or decrypt one of the encrypted data frames, respectively.

11. The communication device of claim 1, wherein the MAC unit is further adapted to send a trigger signal to the security enhancement unit during the on-the-fly encryption process or during the on-the-fly decryption process for making the security enhancement unit encrypt one of the plaintext data frames or decrypt one of the encrypted data frames, respectively.

12. The communication device of claim 1, wherein the security enhancement unit is further adapted to encrypt the plaintext data frames and decrypt the encrypted data frames due to trigger signals during the on-the-fly encryption process or during the on-the-fly decryption process, respectively.

13. The communication device of claim 1, wherein the communication device is integrated in a host computer system comprising a CPU (Central Processing Unit) for providing WLAN compatibility to the host computer system.

14. The communication device of claim 13, further comprising a MAC driver software running on the CPU of the host computer system, for performing a connection set-up for the cryptographically secured communication.

15. The communication device of claim 14, wherein the MAC driver software is adapted to perform the connection set-up thereby authenticating the communication device as an authorized WLAN participant.

16. The communication device of claim 14, wherein the MAC driver software is adapted to associate the communication device with another communication device within the WLAN network as WLAN counterparts during the connection set-up.

17. The communication device of claim 14, wherein the MAC driver software is adapted to exchange cryptographic keys with another communication device within the WLAN network during the connection set-up.

18. The communication device of claim 13, further comprising a storage unit wherein the storage unit is adapted to exchange the plaintext data frames with the host computer system over an interface.

19. The communication device of claim 18, wherein the storage unit is further adapted to exchange the plaintext data frames with the host computer system via the CPU.

20. The communication device of claim 1, wherein the MAC unit and the physical layer unit are adapted to exchange the encrypted data frames during the on-the-fly encryption process and on-the-fly decryption process without buffering the encrypted data frames after encryption or prior to decryption, respectively.

21. The communication device of claim 1, wherein the physical layer unit is adapted to send and receive the transmission signals over the shared wireless communication medium without buffering the transmission signals after encryption or prior to decryption, respectively.

22. The communication device of claim 1, wherein the on-the-fly encryption process and on-the-fly decryption process comprises a hardware-implemented on-the-fly encryption process or hardware-implemented on-the-fly decryption process, respectively; and
wherein the security enhancement unit comprises a dedicated hardware device adapted to perform the hardware-implemented on-the-fly encryption process and hardware-implemented on-the-fly decryption process without executing software-implemented instructions.

23. The communication device of claim 1, wherein MAC unit comprises a dedicated hardware device adapted to perform the on-the-fly encryption process and on-the-fly decryption process without executing software-implemented instructions.

24. The communication device of claim 1, adapted to perform the cryptographically secured communication based on the IEEE 802.11b standard.

25. The communication device of claim 1, adapted to perform the cryptographically secured communication based on the IEEE 802.11i standard.

26. The communication device of claim 1, wherein the security enhancement unit is adapted to encrypt the plaintext data frames and decrypt the encrypted data frames based on the TKIP (Temporary Key Integrity Protocol) protocol.

27. The communication device of claim 1, wherein the security enhancement unit is adapted to encrypt the plaintext data frames and decrypt the encrypted data frames based on the CCMP (Counter-mode Cipher block chaining Message authentication code Protocol) protocol.

* * * * *

UNITED STATES PATENT AND TRADEMARK OFFICE
CERTIFICATE OF CORRECTION

PATENT NO. : 7,505,598 B2  
APPLICATION NO. : 10/899199  
DATED : March 17, 2009  
INVENTOR(S) : Matthias Baer et al.

It is certified that error appears in the above-identified patent and that said Letters Patent is hereby corrected as shown below:

In the Claims:

Claim 1, col. 9, line 33, please change "and" to "and/or".
Claim 1, col. 9, line 43, please change "and" to "and/or".
Claim 1, col. 9, line 58, please change "and" to "and/or".
Claim 8, col. 10, line 20, please change "packet and" to "packet and/or".
Claim 9, col. 10, line 30, please change "and" to "and/or".
Claim 10, col. 10, line 35, please change "and" to "and/or".
Claim 12, col. 10, line 48, please change "and" to "and/or".
Claim 20, col. 11, line 15, please change "and" to "and/or".
Claim 22, col. 11, line 24, please change "and" to "and/or".
Claim 23, col. 12, line 8, please change "and" to "and/or".
Claim 26, col. 12, line 19, please change "and" to "and/or".
Claim 27, col. 12, line 23, please change "and" to "and/or".

Signed and Sealed this

Nineteenth Day of May, 2009

JOHN DOLL  
*Acting Director of the United States Patent and Trademark Office*